US011760042B2

(12) United States Patent
Eichenhofer et al.

(10) Patent No.: US 11,760,042 B2
(45) Date of Patent: Sep. 19, 2023

(54) METHOD AND DEVICE FOR CUTTING OFF AN EXTRUDATE

(71) Applicant: 9T LABS AG, Zürich (CH)

(72) Inventors: Martin Eichenhofer, Zürich (CH); Giovanni Cavolina, Zürich (CH); Chester Houwink, Zürich (CH)

(73) Assignee: 9T Labs AG, Zürich (CH)

( * ) Notice: Subject to any disclaimer, the term of this patent is extended or adjusted under 35 U.S.C. 154(b) by 392 days.

(21) Appl. No.: 17/041,200

(22) PCT Filed: Mar. 27, 2019

(86) PCT No.: PCT/EP2019/000098
§ 371 (c)(1),
(2) Date: Sep. 24, 2020

(87) PCT Pub. No.: WO2019/185194
PCT Pub. Date: Oct. 3, 2019

(65) Prior Publication Data

US 2021/0031469 A1 Feb. 4, 2021

(30) Foreign Application Priority Data

Mar. 28, 2018 (DE) ..................... 10 2018 002 545.5

(51) Int. Cl.
*B29C 70/54* (2006.01)
*B29C 48/154* (2019.01)
(Continued)

(52) U.S. Cl.
CPC .............. *B29C 70/545* (2013.01); *B26D 1/08* (2013.01); *B29C 48/0022* (2019.02);
(Continued)

(58) Field of Classification Search
CPC .......... B29C 70/526; B29C 70/50–528; B29C 48/301; B29C 48/303; B29C 48/0022;
(Continued)

(56) References Cited

U.S. PATENT DOCUMENTS 3,387,069 A * 6/1968 Stohr ...................... B29C 48/34
264/150
3,389,431 A * 6/1968 Kelly .................... B29C 59/021
425/327
(Continued)

FOREIGN PATENT DOCUMENTS

DE 102015007317 12/2016
EP 2586600 5/2013
(Continued)

OTHER PUBLICATIONS

Search Report and Written Opinion for International Application No. PCT/EP2019/000097 dated Jul. 8, 2019 (9 pages).
(Continued)

*Primary Examiner* — Jeffrey M Wollschlager
(74) *Attorney, Agent, or Firm* — Dicke, Billig & Czaja, PLLC

(57) ABSTRACT

A process unit and methods are disclosed. One process unit including a pultrusion unit having a pultrusion channel, with the pultrusion channel being limited by at least one shaping wall. The process unit further includes an extrusion unit having an extrusion channel and an opening for removing the extrudate out of the extrusion channel, a cutting unit having a moving cutting element for cutting off the extrudate with the moving cutting element, and a conveying device for conveying a raw extrudate from the pultrusion unit into the extrusion unit. The cutting unit comprises a component that can be caused to move in a rotational manner and the component is mechanically coupled to the cutting element by a mechanical coupling device, such that the rotational
(Continued)

movement of the component determines the movement of the cutting element.

10 Claims, 15 Drawing Sheets

(51) Int. Cl.

| | |
|---|---|
| ***B29C 48/285*** | (2019.01) |
| ***B29C 48/00*** | (2019.01) |
| ***B29C 48/793*** | (2019.01) |
| ***B29C 48/79*** | (2019.01) |
| ***B29C 48/06*** | (2019.01) |
| ***B26D 1/08*** | (2006.01) |
| ***B29C 70/52*** | (2006.01) |
| ***B29K 277/00*** | (2006.01) |
| ***B29K 307/04*** | (2006.01) |
| ***B29K 309/08*** | (2006.01) |

(52) U.S. Cl.
CPC ............ *B29C 48/022* (2019.02); *B29C 48/06* (2019.02); *B29C 48/154* (2019.02); *B29C 48/2886* (2019.02); *B29C 48/79* (2019.02); *B29C 48/793* (2019.02); *B29C 70/521* (2013.01); *B29C 70/526* (2013.01); *B29C 70/528* (2013.01); *B29C 2793/009* (2013.01); *B29C 2793/0027* (2013.01); *B29K 2277/00* (2013.01); *B29K 2307/04* (2013.01); *B29K 2309/08* (2013.01)

(58) Field of Classification Search
CPC ..... B29C 48/022; B29C 48/06; B29C 48/154; B29C 48/2886; B29C 48/79; B29C 48/793; B29C 48/20; B29C 48/865; B29C 48/001; B29C 48/155; B29C 48/2888; B29B 11/02; B29B 11/04; B29B 11/06; B29B 11/10; B29B 11/14; B29B 11/16; B29B 7/826; B29B 7/90; B26D 1/08; B26D 5/08; B26D 5/086; B26D 5/12; B26D 5/16; B26D 1/00; B29K 2277/00; B29K 2307/04; B29K 2309/08; B29K 2021/003; B29K 2105/0809; B29K 2105/089; B29K 2021/006
See application file for complete search history.

(56) References Cited

U.S. PATENT DOCUMENTS

| | | | | |
|---|---|---|---|---|
| 5,114,516 | A * | 5/1992 | Pilling | D04H 3/12 156/166 |
| 5,641,529 | A * | 6/1997 | Kunas | B29C 48/12 425/382.2 |
| 2006/0016307 | A1* | 1/2006 | Rieck | B01J 2/20 83/13 |
| 2006/0204739 | A1 | 9/2006 | Papke et al. | |
| 2011/0104319 | A1* | 5/2011 | Muscroft | B30B 11/208 425/113 |
| 2013/0142997 | A1 | 6/2013 | Hofmann | |
| 2017/0144375 | A1* | 5/2017 | Waldrop, III | B29C 69/001 |
| 2017/0368768 | A1 | 12/2017 | Johnson et al. | |
| 2018/0169906 | A1* | 6/2018 | Eichenhofer | B29D 99/001 |
| 2018/0319106 | A1 | 11/2018 | Johnson et al. | |

FOREIGN PATENT DOCUMENTS

| | | |
|---|---|---|
| GB | 2236504 | 4/1991 |
| WO | 91/13195 | 9/1991 |

OTHER PUBLICATIONS

Search Report and Written Opinion for International Application No. PCT/EP2019/000098 dated Jul. 17, 2019 (7 pages).

* cited by examiner

State of the art

State of the art

State of the art

State of the art

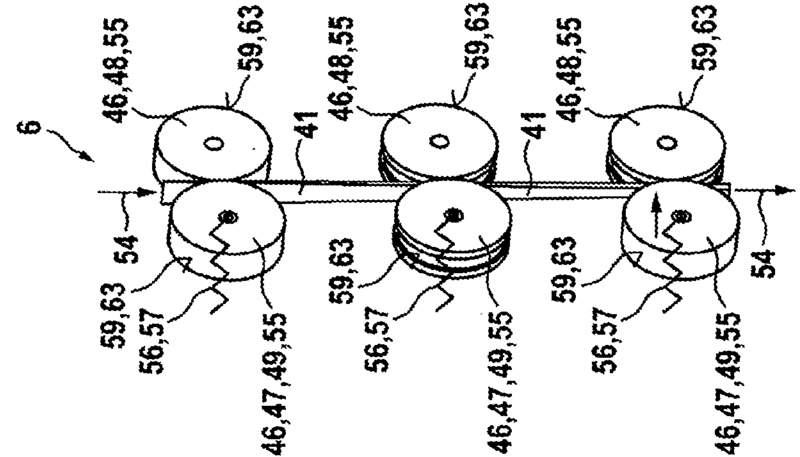
Fig. 20
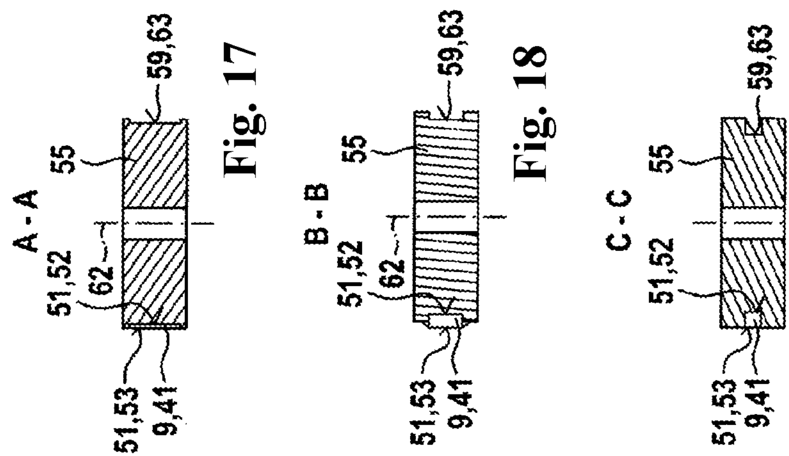
Fig. 17
Fig. 18
Fig. 19
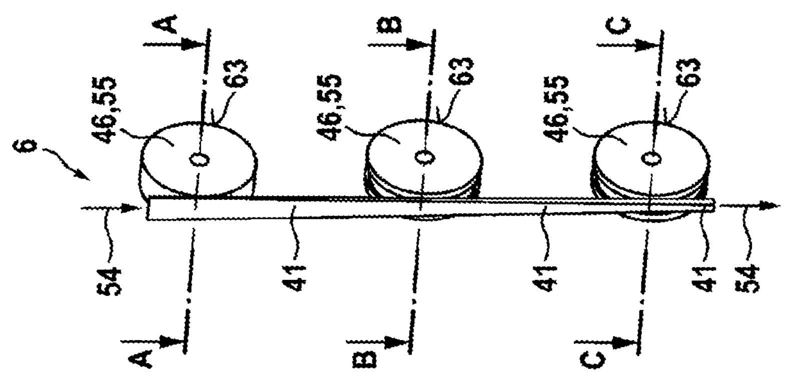
Fig. 16

46,58,63
62
46,47,49,55

46,58,63
62
46,47,49,55

46,59,63
62
9
46,47,49,55

46,59,63
62
9
46,47,49,55

METHOD AND DEVICE FOR CUTTING OFF AN EXTRUDATE

CROSS-REFERENCE TO RELATED APPLICATIONS

This Utility Patent Application claims priority under 35 U.S.C. § 371 to International Application Serial No. PCT/EP2019/000098 filed Mar. 27, 2019, which claims the benefit of German Application No. DE 10 2018 002 545.5, filed Mar. 28, 2018, both of which are incorporated herein by reference.

FIELD OF THE DISCLOSURE

The present disclosure relate to a method for producing an extrudate as well as a process unit.

BACKGROUND

Process units having an optional pultrusion unit and an extrusion unit are used to produce a strand-like extrudate. In the pultrusion unit, a matrix, for example a thermoplastic material, is usually materially bonded with fibres, and the crude extrudate is furthermore deformed in the pultrusion unit along with the matrix and the fibres. In the extrusion unit, the crude extrudate from the pultrusion unit is formed into the extrudate's final form and the extrudate is cut with a movable cutting element.

DE 10 2015 007 317 A1 shows a method for reinforcing an existing basic structure with a reinforcing structure. The reinforcing structure is produced using a process unit having a pultrusion unit and an extrusion unit.

US 2017/0144375 A 1 shows a method, a device and a system for cutting material.

BRIEF DESCRIPTION OF THE DRAWINGS

Embodiments of the disclosure are described in more detail in the following with reference to the attached drawings.

The figures show.

DETAILED DESCRIPTION

Figure 1:
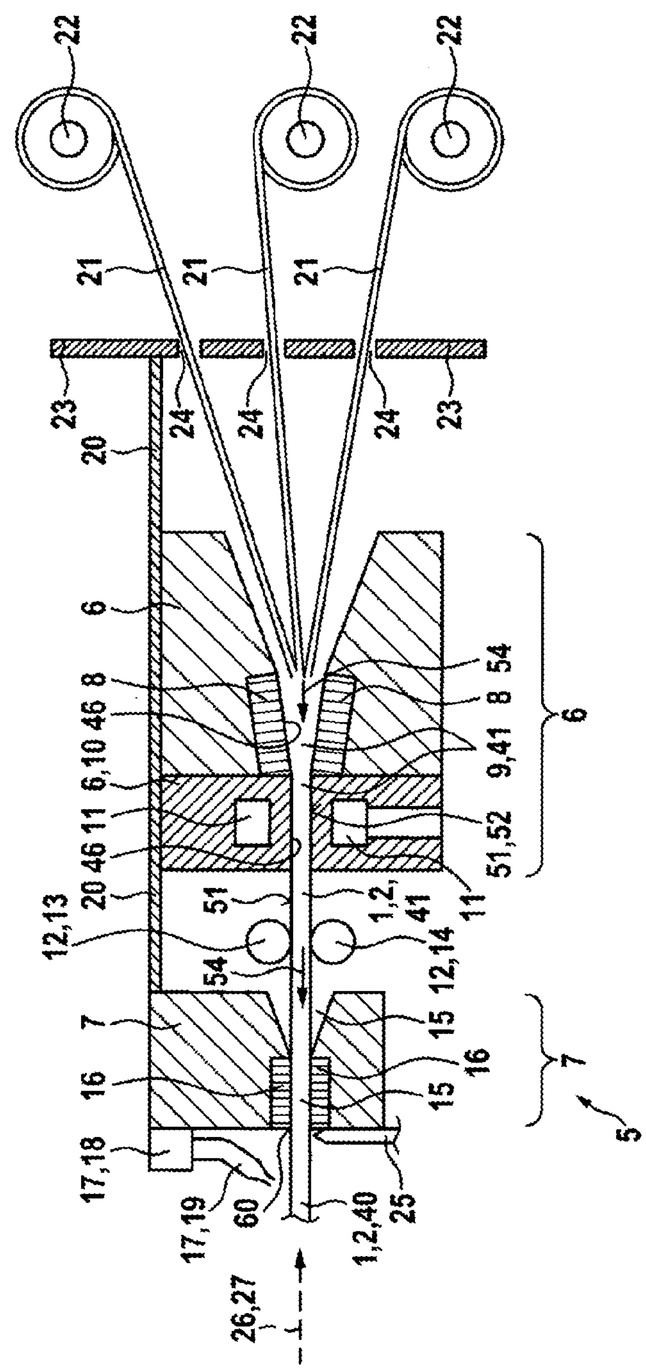
FIG. 1 a simplified longitudinal section of a process unit with a pultrusion unit and an extrusion unit for implementing the method, FIG. 2 a side view of the process unit during the implementation of the method, FIG. 3 a cross-section of a basic structure prior to placement of a reinforcing structure, FIG. 4 the cross-section of the basic structure of FIG. 3 after placement of the reinforcing structure, FIG. 5 a perspective view of a pultrusion unit from the state of the art, FIG. 6 a section A-A of the pultrusion unit of FIG. 6, FIG. 7 a section B-B of the pultrusion unit of FIG. 6, FIG. 8 a section C-C of the pultrusion unit of FIG. 6, FIG. 9 a perspective view of a pultrusion unit according to the invention in a first embodiment, FIG. 10 a longitudinal section of the pultrusion unit through a pultrusion channel, FIG. 11 a section A-A of the pultrusion unit of FIG. 9, FIG. 12 a section B-B of the pultrusion unit of FIG. 9, FIG. 13 a section C-C of the pultrusion unit of FIG. 9, FIG. 14 a perspective view of a pultrusion unit according to the invention in a second embodiment, FIG. 15 a section A-A of the pultrusion unit of FIG. 14, FIG. 16 a perspective view of a pultrusion unit according to the invention in a third embodiment, FIG. 17 a section A-A of the pultrusion unit of FIG. 16, FIG. 18 a section B-B of the pultrusion unit of FIG. 16, FIG. 19 a section C-C of the pultrusion unit of FIG. 16, FIG. 20 a perspective view of a pultrusion unit according to the invention in a fourth embodiment, FIG. 21 a cross-section of a pultrusion channel in a first embodiment, FIG. 22 a cross-section of a pultrusion channel in a second embodiment, FIG. 23 a cross-section of a pultrusion channel in a third embodiment, FIG. 24 a cross-section of a pultrusion channel in a fourth embodiment, FIG. 25 a cross-section of a roller in a first embodiment, FIG. 26 a cross-section of a roller in a second embodiment, FIG. 27 a cross-section of a roller in a third embodiment, FIG. 28 a cross-section of a roller in a fourth embodiment, FIG. 29 a view of a hardenable mass and of fibres in a first embodiment for feeding into the pultrusion unit, FIG. 30 a view of a hardenable mass and of fibres in a second embodiment for feeding into the pultrusion unit, FIG. 31 a perspective view of an extrusion unit in a further embodiment, FIG. 32 a longitudinal section of the extrusion unit of FIG. 32, FIG. 33 a front view of the extrusion unit of FIG. 32 without a cover and die section with the cutting element in a first position, and FIG. 34 a front view of the extrusion unit of FIG. 32 without a cover and die section with the cutting element in a second position.

The object of the present invention is therefore to provide a method for producing an extrudate and a process unit, in which the extrudate can be cut easily, reliably and with a minimal space requirement by a movable cutting element.

This object is achieved with a method for producing an extrudate, preferably strand-like, comprising the steps: preferably introducing a hardenable matrix and fibres of a crude extrudate into a pultrusion unit, preferably deforming the crude extrudate in the pultrusion unit because, during the movement of the crude extrudate through a pultrusion channel of the pultrusion unit, an outer side of the crude extrudate rests on at least one shaping wall of the pultrusion unit, preferably discharging the deformed crude extrudate from the pultrusion unit, preferably introducing the crude extrudate discharged from the pultrusion unit into an extrusion unit, deforming the crude extrudate in the extrusion unit and discharging the crude extrudate that has been reshaped to form the extrudate from an opening of the extrusion unit, cutting the extrudate by moving a cutting element, whereby a component of the extrusion unit carries out a rotational movement and the cutting element is moved by means of a mechanical coupling between the rotating component and the cutting element in order to cut the extrudate. The crude extrudate is deformed in the pultrusion unit and the fibres are optionally materially bonded with the matrix in the pultrusion unit. The optional execution of the material bond between the fibres and the matrix in the pultrusion unit depends on the type of crude extrudate used. In the case of hybrid yarns, for example, the fibres and the matrix are not yet materially bonded to one another when they are introduced into the pultrusion unit, so that a material bond between the fibres and the matrix is produced in the pultrusion unit. If the crude extrudate is a composite tape, the fibres and the matrix are already at least partially materially bonded to one another before being introduced into the pultrusion unit, so that no, or only a minimal, material bond between the fibres and the matrix is produced in the pultrusion unit. Normally, however, even when the crude extrudate is a composite tape, a material bond between the fibres and the matrix is produced in the pultrusion unit, because heating and reshaping the crude extrudate in the pultrusion unit results in an additional and/or modified material bond between the fibres and the matrix.

In an additional variant, the rotational movement of the component is converted into a movement having a movement direction substantially perpendicular to the axis of rotation of the rotational movement of the component by means of the mechanical coupling.

In a further embodiment, the cutting element carries out a rotational movement and/or a translational movement. The type of movement depends in particular on the mounting of the cutting element.

In a further variant, the rotating component is configured as a sleeve and/or a cylinder jacket-shaped component that encloses the extrusion channel.

Suitably, the cutting element rests indirectly, in particular with a slide, or directly on a recess, on the rotating component so that, due to the preferably eccentric geometry of the recess relative to the axis of rotation, a force is applied indirectly, in particular with a slide, or directly, from the rotating component to the cutting element to move the cutting element.

The process unit according to the invention, comprising: preferably a pultrusion unit with a pultrusion channel and the pultrusion channel is bounded by at least one shaping wall, an extrusion unit with an extrusion channel and an opening for discharging the extrudate from the extrusion channel, a cutting unit with a movable cutting element for cutting the extrudate with the movable cutting element, preferably a conveying device for conveying a crude extrudate from the pultrusion unit into the extrusion unit, whereby the cutting unit comprises a component that can be caused to carry out a rotational movement and the component is mechanically coupled to the cutting element with a mechanical coupling device, so that the rotational movement of the component causes the movement of the cutting element.

In a further embodiment, the component is configured as a sleeve or a substantially cylinder jacket-shaped component and the component indirectly or directly encloses an extrusion channel of the extrusion unit and/or the distance between the axis of rotation of the component that can be caused to carry out the rotational movement and the extrusion channel perpendicular to the axis of rotation of the component is smaller than the diameter, in particular smaller than 70%, 50% or 30% of the diameter, of the extrusion unit perpendicular to the axis of rotation of the component that can be caused to carry out the rotational movement. The component preferably encloses at least 30%, 50%, 70% or 80% of the length of the extrusion channel.

In an additional embodiment, the process unit, in particular the extrusion unit, comprises a motor, in particular an electric motor, pneumatic motor or hydraulic motor, and the component is driven by said motor.

In a supplementary embodiment, a supporting surface, in particular a recess, on the component is configured as a mechanical coupling device and at least one end of the cutting element rests indirectly, in particular with a slide, or directly on the supporting surface, in particular the recess, so that, because of the contact of the at least one end with the component on the supporting surface, in particular the recess, a rotational movement of the component causes a movement of the cutting element, whereby a force is preferably applied indirectly or directly to another end of the cutting element with an elastic element, in particular a spring, so that the at least one end constantly rests indirectly or directly on the supporting surface, in particular the recess. A surface of the component that bounds the recess is also regarded as a recess. The supporting surface can also be configured on a geometry of the component, preferably a projection, in particular an annular projection, on the component, so that a surface of the component that is configured on the geometry of the component is also regarded as a supporting surface.

In an additional variant, the first and second end constantly rests indirectly or directly on the circular recess, because the distance between the first and second end substantially corresponds to the diameter of the circular recess.

In a further variant, a circular recess on the component is configured as a mechanical coupling device and a first end of the cutting element rests indirectly, in particular with a slide, or directly on the circular recess and a second end of the cutting element rests indirectly, in particular with a slide, or directly on the circular recess and the circular recess is configured eccentrically to the axis of rotation of the component.

In a further variant, in a section through the crude extrudate perpendicular to the movement direction of the crude extrudate in the pultrusion channel, a first portion of the outer side of the crude extrudate rests on at least one shaping wall of the pultrusion unit during the movement through the pultrusion unit and a second portion of the outer side of the crude extrudate is not in contact with the at least one shaping wall and/or, in a section through the crude extrudate perpendicular to the movement direction of the crude extrudate in the pultrusion channel, the outer side of the crude extrudate rests on at least one shaping wall of the pultrusion unit during the movement through the pultrusion unit, and the distance between a first shaping wall and a second shaping wall is varied perpendicular to the movement direction of the crude extrudate in the pultrusion channel, so that the cross-sectional area available to the crude extrudate between the first and second shaping wall in the pultrusion channel is varied. The cross-sectional area of the crude extrudate in the pultrusion channel is thus varied during the movement of the crude extrudate at an identical section perpendicular to the movement direction of the crude extrudate in the pultrusion channel, so that a blockage of the crude extrudate, in particular as a result of material tolerances, can preferably be substantially avoided. The cross-sectional area available to the crude extrudate is preferably varied by at least 5%, 10%, 20% or 30% because of the movement of the first and second shaping wall.

In a further embodiment, on the second portion of the outer side of the crude extrudate, the crude extrudate is only in contact with the ambient air or a process gas. A movement of the crude extrudate on the second portion of the outer side can therefore be carried out to increase the cross-sectional area of the crude extrudate.

In a supplementary example, the at least one shaping wall is fixed, in particular in a movement direction parallel to the crude extrudate, so that the crude extrudate carries out a relative movement to the at least one shaping wall as a result of the movement of the crude extrudate through the pultrusion unit.

In an additional embodiment, as a movement wall, the at least one shaping wall follows the movement of the crude extrudate through the pultrusion unit at least partially, in particular completely, so that the relative movement speed between the movement speed of the crude extrudate and the movement speed of the at least one movement wall is smaller than the movement speed of the crude extrudate through the pultrusion unit, and the movement speed of the crude extrudate and the movement speed of the at least one movement wall are in particular substantially identical, whereby substantially preferably means that the movement speed of the crude extrudate and the movement speed of the at least one movement wall differ by less than 20%, 10%, 5% or 3%.

The at least one wall is suitably configured as a movement wall of at least one roller and/or at least one die moved by a mechanism. A radial outer side of the at least one roller rests on the crude extrudate, so that the rotational speed of the radial outer side of the roller corresponds substantially to the translational speed of the outer side of the crude extrudate, because the roller is set in a corresponding rotational movement caused by the crude extrudate. The mechanism is driven by a motor, in particular an electric motor, and the die is placed onto the outer side of the crude extrudate and then temporarily follows the translational movement of the crude extrudate. The die is then lifted off the crude extrudate, moved back and then placed on the crude extrudate again, whereby this process is carried out repeatedly.

In an additional embodiment, the first and/or second shaping wall is pressed onto the outer side of the crude extrudate with a pressing force, in particular in a pressing force direction perpendicular to the movement direction of the crude extrudate, so that the first and/or second shaping wall is moved in a movement direction perpendicular to the movement direction of the crude extrudate. The pressing force is necessary for the shaping wall to cause a sufficient deformation of the crude extrudate.

The first and/or second shaping wall is preferably pressed onto the outer side of the crude extrudate by means of an actuator, in particular an electric motor or a movable piston, and/or an elastic element, in particular a spring.

In an additional example, the first and/or second shaping wall is formed by a roller and the roller is moved in a movement direction perpendicular to the movement direction of the crude extrudate. The movement of the roller changes the cross-sectional area of the crude extrudate.

In a further example, the pultrusion channel bounded by the at least one shaping wall is conically tapered in the movement direction of the crude extrudate, so that the width of the crude extrudate decreases and the thickness of the crude extrudate increases during the deformation of the crude extrudate in the pultrusion unit.

In one embodiment, the fibres are materially bonded with the hardenable matrix in the pultrusion unit, in particular in the pultrusion channel. It depends on the type of crude extrudate used whether or not the fibres are materially bonded to the matrix in the pultrusion unit.

In an additional example, the fibres and preferably the hardenable matrix are stressed with a tensile force during the movement of the crude extrudate through the pultrusion channel of the pultrusion unit.

In a further embodiment, the at least one wall comprises a concave and/or convex surface as a movement wall, and the concave and/or convex surface of the movement wall rests on the crude extrudate, so that a complementary geometry is worked into the outer side of the crude extrudate.

In an additional embodiment, an existing basic structure is reinforced with at least one reinforcing structure to form a supporting structure with the steps: producing the at least one reinforcing structure, connecting the at least one reinforcing structure to the basic structure, so that the at least one reinforcing structure is connected to the basic structure in a connecting position and the basic structure together with the at least one reinforcing structure forms the supporting structure, wherein the at least one reinforcing structure, in particular all the reinforcing structures, is/are made of a composite material with fibres and a matrix by means of pultrusion and/or extrusion and a pultrusion unit and/or an extrusion unit and/or a process unit is moved in the space, so that, after the pultrusion and/or extrusion, the at least one reinforcing structure, in particular all the reinforcing structures is/are respectively pultruded and/or extruded onto the basic structure at the required connecting position and the reinforcing structure is produced as an extrudate using a method described in this patent application.

In an additional embodiment, the pultrusion channel is partially open.

In a further embodiment, the pultrusion channel is at least partially substantially U-shaped or V-shaped in cross-section.

In an additional embodiment, the method is carried out with a process unit described in this patent application.

The process unit described in this patent application is preferably a process unit for carrying out the method described in this patent application.

In a further embodiment, the crude extrudate is moved in the extrusion unit through an extrusion channel.

The second portion of the outer side of the crude extrudate preferably comprises at least 10%, 20% or 30% of the total outer side of the crude extrudate, in particular in a section perpendicular to the movement direction of the crude extrudate in the pultrusion channel.

In a further embodiment, a force, in particular a tensile force, is applied to the crude extrudate with tensioning devices, in particular tensioning rollers, in particular at the beginning and end of the pultrusion unit, so that the crude extrudate, in particular the fibres in the pultrusion channel, have a tensile force in the pultrusion unit.

In a further embodiment, the crude extrudate is deflected by at least one deflecting device, in particular at least one deflecting roller, before being introduced into the pultrusion channel and/or after being discharged from the pultrusion channel, so that, during introduction, the crude extrudate is preferably oriented at an angle $\alpha_1$ and/or, during discharge, at an angle $\alpha_2$ to a plane perpendicular to the movement direction of the crude extrudate in the pultrusion channel. The angle $\alpha_1$ and the angle $\alpha_2$ are preferably between 0° and 90°, in particular between 20° and 80°.

The at least one tensioning device suitably also forms at least one deflecting device.

In a further embodiment, after pultrusion and/or extrusion and placement on the basic structure, the pultruded and/or extruded at least one reinforcing structure, in particular all the reinforcing structures, does/do not carry out a movement relative to the basic structure and/or the matrix of the pultruded and/or extruded reinforcing structure, in particular all the reinforcing structures, is/are hardened at the required connecting position on the basic structure and/or pultrusion and extrusion is carried out simultaneously and/or continuously.

In a further embodiment, pultrusion is carried out as a first step for the production of the extrudate and extrusion is carried out as a second step, so that the pultruded crude extrudate partially produced in the first step is post-processed in the second step with extrusion.

The extrudate, in particular the reinforcing structure, preferably all the reinforcing structures, is/are suitably produced, in particular continuously, by moving the pultrusion unit and/or extrusion unit and/or process unit, in particular continuously, in the space in a movement path at and/or in the region of the required connecting position at a or no distance from the basic structure. The distance is in the range between 0 mm and a few mm or cm. The pultrusion unit and/or extrusion unit and/or process unit is moved substantially at the required connecting position because, after the at least one reinforcing structure is discharged from the process unit, the reinforcing structure is still at a small or no distance from the basic structure.

In a further example, the basic structure of the extrusion unit is plastically and preferably elastically deformed by the extrusion unit during the movement of the extrusion unit in the space, so that at least one recess is formed in the basic structure as a result of the plastic deformation of the basic structure and the at least one reinforcing structure is placed into the at least one recess at the required connecting position.

The pultrusion unit and/or extrusion unit and/or process unit is suitably moved with a robot and/or, after pultrusion and/or extrusion of a respective extrudate, the extrudate with the fibres and the matrix is cut with a cutting unit.

In an additional embodiment, the crude extrudate and/or the extrudate are conveyed continuously first through the pultrusion unit and then through the extrusion unit.

Hybrid yarns or composite tapes with fibres and matrix are suitably conveyed to the pultrusion unit or the fibres and the matrix are conveyed separately to the pultrusion unit.

In an additional embodiment, the fibres are materially bonded to one another in the pultrusion unit during pultrusion by means of the matrix, in particular by heating and/or hardening the matrix, and/or cooling and/or hardening the matrix during conveyance from the pultrusion unit to the extrusion unit, so that the fibres are materially bonded to one another, and/or the crude extrudate is conveyed by means of a conveying device, for example two conveying wheels, in particular by the conveying device acting on the crude extrudate while conveying the crude extrudate from the pultrusion unit to the extrusion unit, and/or the fibres and the matrix are first deformed by means of pultrusion and preferably materially bonded to one another, in particular by heating and/or hardening the matrix, and then the cross-sectional shape of the extrudate is at least partially formed during extrusion in the extrusion unit.

In a further embodiment, the crude extrudate is understood to be an arrangement and/or mixture of matrix and fibres, regardless of whether the fibres are materially bonded with the matrix or not.

The extrudate suitably has a maximum diameter of less than 10 mm, 5 mm, 3 mm, 1 mm or 0.7 mm. The extrudate has a cross-sectional shape as a rectangle, square, or ellipse, for example, with a maximum diameter of less than 10 mm, 5 mm, 3 mm, 1 mm, or 0.7 mm.

In a further embodiment, the crude extrudate is heated in the pultrusion unit, in particular with a heating device.

In an additional embodiment, the crude extrudate and/or extrudate is deformed in the extrusion unit.

Suitably, the crude extrudate is initially heated in the pultrusion unit, the crude extrudate cools when it is conveyed from the pultrusion unit to the extrusion unit, and the crude extrudate is then heated again in the extrusion unit.

The crude extrudate is suitably actively cooled in the pultrusion unit with a, preferably first, cooling device.

In a further embodiment, the extrudate is actively cooled after being conveyed through the extrusion unit with a, preferably second, cooling device, for example a blower.

In a further embodiment, the extrudate is produced as a matrix with a plastic, preferably a thermoplastic and/or thermosetting material and/or a plastic as a reactive hot melt or reactive hot melt adhesive or reactive hot melt polymer. Plastics as a reactive hot melt or reactive hot melt adhesive or reactive hot melt polymer are plastics that preferably initially have thermoplastic properties and/or are a thermoplastic material and, after at least one change parameter, for example warming or heating and/or exposure to moisture and/or irradiation with UV light and/or removal of oxygen, via a chemical modification, in particular at least one chemical reaction, have thermosetting properties and/or are a thermosetting material. If the change parameter is warming or heating, warming and/or heating can be used as a change parameter in the pultrusion unit and/or extrusion unit. Thermosetting materials are 100% solid even when warmed or heated, i.e., hardening is not reversible by heating. Warming and/or heating in the pultrusion unit and/or extrusion unit is carried out at temperatures between 60° C. and 200° C., for example. For a reactive hot melt, for example based on polymers, the chemical modification is carried out via a connection between existing macromolecular chains (so-called cross-links). Reactive hot melts are structured on the basis of EVA (ethylene-vinyl acetate) and polyester, for example, or on the basis of PA (polyamide) or on the basis of polymers or on the basis of PUR. Reactive hot melts can partially also contain substances that are not plastics or adhesives. In this respect, adhesives are also regarded as plastics. The essential property of the reactive hot melt or reactive hot melt adhesive or reactive hot melt polymer is therefore that, after hardening as a result of the action of the at least one change parameter, a heating of the at least one reinforcing structure does not cause the reactive hot melt or the matrix made of the reactive hot melt to melt, so that, despite heating to temperatures normal for the application, for example temperatures up to 200° C. or 300° C., the load-bearing capacity and/or rigidity of the extrudate is still guaranteed.

In an additional embodiment, the extrudate is produced with fibres in the form of glass fibres, carbon fibres and/or aramid fibres.

In a further embodiment, prior to placing the at least one reinforcing structure on the surface of the basic structure, the material of the basic structure is removed locally on the surface of the basic structure in the region of a later contact surface between the at least one reinforcing structure and the basic structure.

The basic structure is preferably removed by machining, in particular with a tool, preferably a milling tool, and the tool is moved along the surface of the basic structure by a robot.

In an additional example, a preferably elongated recess is worked into the basic structure as a result of the removal and/or deformation, in particular plastic deformation, of the material of the basic structure, and the at least one reinforcing structure is then placed into the recess, so that a form-locking connection between the at least one reinforcing structure and the basic structure is formed at the recess, in particular after cooling and hardening of the matrix.

In an alternative embodiment, prior to placing the at least one reinforcing structure on the surface of the basic structure, the surface of the basic structure is locally heated in the region of a later contact surface between the at least one reinforcing structure and the basic structure with a basic structure heating device, in particular a laser or an infrared radiator or a fan heater.

In a further embodiment, the basic structure heating device is moved along the surface of the basic structure by a robot and/or, as a result of the heating of the surface of the basic structure, the properties of the material of the basic structure are changed locally in the region of a later contact surface between the at least one reinforcing structure and the basic structure, in particular with respect to being viscous and/or sticky and/or liquid, so that a material bond is formed between the matrix of the at least one reinforcing structure and the material of the basic structure, in particular after cooling.

In an alternate embodiment, prior to placing the at least one reinforcing structure on the surface of the basic structure, a substance, in particular an adhesive and/or an adhesion promoter, is applied locally in the region of a later contact surface between the at least one reinforcing structure and the basic structure using a supply device to improve the connection between the at least one reinforcing structure and the basic structure.

The supply device is preferably moved along the surface of the basic structure by a robot.

In an alternate embodiment, the basic structure is produced or provided first, and the at least one reinforcing structure is produced afterwards.

The basic structure is suitably produced using a different method than the at least one reinforcing structure.

The basic structure is suitably made of metal, in particular steel and/or aluminium, and/or plastic, in particular fibre-reinforced plastic or styrofoam or plastic foam or plastic, and/or in sandwich construction of two different materials.

In a further variant, the basic structure is configured as a planar component, a plate, a disc, a partial spherical shell, a dome, a partial rotational ellipsoid, a well or a cup.

The invention further includes a computer program with program code means stored on a computer-readable data carrier for carrying out a method described in this patent application when the computer program is executed on a computer or a corresponding processing unit.

A further component of the invention is a computer program product with program code means stored on a computer-readable data carrier for carrying out a method described in this patent application when the computer program is executed on a computer or a corresponding processing unit.

Figure 2:
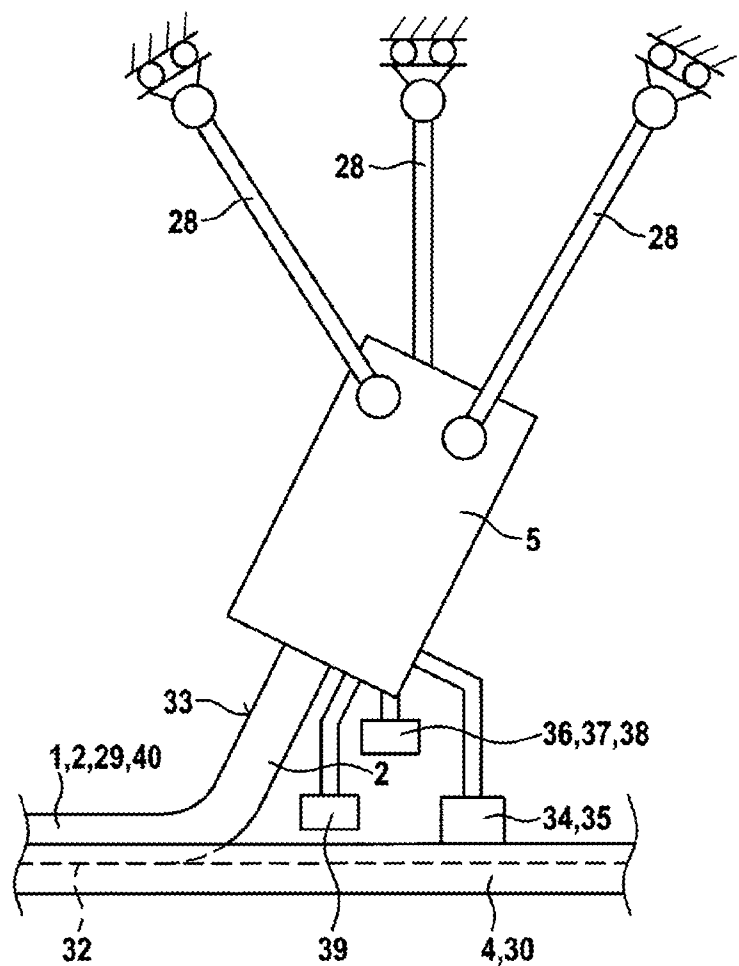

FIGS. 1 and 2 show a process unit 5 according to the invention for producing a reinforcing structure 1 as an extrudate 40. The process unit 5 comprises a pultrusion unit 6 and an extrusion unit 7. A pultrusion channel 9 is configured in the pultrusion unit 6 and, in a direction from right to left as a movement direction 54 of a crude extrudate 41 as shown in FIG. 1, the pultrusion channel 9 is initially configured in one section to be conically tapered with a decreasing width 42 and then with a constant width 42. The pultrusion channel 9 is bounded by shaping walls 46. A first heating device 8 and then a first cooling device 10 are arranged on the pultrusion channel 9 in a direction as shown in FIG. 1 from right to left as the movement direction 42, and also in a conveying direction of hybrid yarns 21 or the extrudate 40 to be produced. The heating device 8 and the cooling device 10 also form the shaping walls 46. A cooling channel 11 is configured on the first cooling device 10, through which a cooling fluid is moved to cool the crude extrudate 41. Under the plane of the drawing of FIG. 1, the pultrusion channel 9 is bounded by a further, not depicted, shaping wall 46. There is no shaping wall 46 above the plane of the drawing of FIG. 1. A first portion 52 of the outer side 51 of the crude extrudate 41 or the matrix 44 with the fibres 45 rests on the shaping walls 46 of the pultrusion unit 6. A different, second portion 53 of the outer side 51 of the crude extrudate 41 not shown in FIG. 1 is not in contact with a shaping wall 46 and is only in contact with the ambient air. The pultrusion channel 9 is thus partially open above the plane of the drawing of FIG. 1. An arrangement and/or mixture of matrix 44 and fibres 45 is already considered to be a crude extrudate 41 before it is introduced into the pultrusion channel 9. The matrix 44 and the fibres 45 are thus also referred to as the crude extrudate 41 throughout the pultrusion channel 9 and before the pultrusion channel 9, without or with a material bond between the fibres 45 and the matrix 44.

The extrusion unit 7 comprises an extrusion channel 15, and the extrusion channel 15 comprises a first conically tapered section and a second section with a constant diameter. A second heating device 16 is provided on the second section of the extrusion channel 15 with the constant diameter. The first and second heating device 8, 16 is preferably configured as an electrical resistance heater. In the conveying direction of the extrudate 40 through the extrusion channel 15, the conically tapered section of the extrusion channel 15 is followed by the section of the extrusion channel 15 with the constant diameter. A conveying device 12 is provided between the pultrusion unit 6 and the extrusion unit 7. The conveying device 12 comprises a first conveying wheel 13 and a second conveying wheel 14, which are driven by a not depicted electric motor. The crude extrudate 41 is positioned between the two conveying wheels 13, 14, so that the crude extrudate 41 is pulled out of the pultrusion unit 6 with the conveying device 12 and pushed into the extrusion unit 7 with the conveying device 12.

The pultrusion unit 6 and the extrusion unit 7 are connected to one another with a connecting part 20, for example a housing shown only partially in FIG. 1. A feed part 23 having three guide bores 24 is attached to the connecting part 20 as well. A hybrid yarn 21 is respectively rolled up on three rollers 22 as storage rollers 22. The hybrid yarn 21 consists of a fibre 45 as a glass fibre 45 and also comprises the matrix 44 made of a thermoplastic material. The matrix 44 as the thermoplastic material is provided in the hybrid yarn 21 as a fibrous matrix 44 or as a matrix fibre 44. The hybrid yarn 21 is flexible and can therefore be unwound from the roller 22. A second cooling unit 17 is attached to the extrusion unit 7 as well. The second cooling unit 17 comprises a blower 18 and a cooling pipe 19. With the aid of the blower 18, ambient air is guided through the cooling pipe 19 and directed to the region of the reinforcing structure 1 immediately after leaving the extrusion unit 7. A cutting unit 25 is used to cut the extrudate 40 extruded at the extrusion unit 7 if necessary, and is thus to be able to produce an end of the extrudate 40.

During the production of the reinforcing structure 1 as the extrudate 40 of the composite material 29 with the fibres 45 and the matrix 44, the extrudate 40 is conveyed first through the pultrusion unit 6 and then through the extrusion unit 7 by means of the conveying device 12 as shown in FIG. 1. However, due to the length of the rods 2 and the distance between the pultrusion unit 6 and the extrusion unit 7, the two processes take place at the same time. The hybrid yarn 21 is thus unwound from the three rollers 22 during the conveying of the crude extrudate 41, and fed into the conically tapered section of the pultrusion channel 9. The three hybrid yarns 21 are heated with the first heating device 8 at the conically tapered section of the pultrusion channel 9 with a decreasing width 42 in the movement direction 54, so that the thermoplastic material of the matrix 44 on the hybrid yarns 21 melts and the glass fibres 45 in the three hybrid yarns 21 are thus materially bonded to one another by means of the matrix 44 of the thermoplastic material as a process step of pultrusion. In addition, as a further process step, a reshaping or deformation of the matrix 44 and the fibres 45 or the crude extrudate 41 is carried out in the pultrusion unit 6, so that the crude extrudate 41 discharged from the pultrusion unit 6 has the proper shape for the extrusion unit 7.

The crude extrudate 41 is then conveyed or moved to the section of the pultrusion channel 9 with the first cooling device 10, so that the crude extrudate 41 is cooled and thus partially hardened. After the crude extrudate 41 is discharged, the crude extrudate 41 is conveyed or fed into the extrusion unit 7 by the conveying device 12. Because the crude extrudate 41 is cooled in the first cooling device 10, the crude extrudate 41 can be conveyed by the conveying device 12. In the extrusion unit 7, the crude extrudate 41 as a composite material 29 with the fibres 45 and the matrix 44 is heated again at the section of the extrusion channel 15 with the constant diameter by the second heating device 16 to such an extent that, at the end region in the conveying direction of the extrusion channel 15, the final shaping of the cross-sectional shape of the reinforcing structure 1 to be produced is formed at an opening 60 as the end of the extrusion channel 15. The opening 60 has a circular cross-sectional shape, so that reinforcing structures 1 are produced as extrudates 40 with a circular cross-section by means of the process unit 5. After the extrudate 40 is discharged from the extrusion channel 15 of the extrusion unit 7, the blower 18 moves ambient air as cooling air through the cooling pipe 19 to the rod 2 as the extrudate 40, so that faster cooling of the reinforcing structures 1 can be achieved.

The reinforcing structures 1 as extrudates 40 produced with the method are configured as straight or curved rods 2. The rods 2 are produced by the process unit 5 at the required connecting position on a basic structure 4, so that the process unit 5 is moved on a movement path 26 as a straight line 27 or a curved line 27 by means of movement arms 28 of a robot shown in FIG. 2 in a highly simplified form. The movement path 26 as a straight line 27 or a curved line 27 substantially corresponds to the longitudinal axis of the reinforcing structure 1 produced by the process unit 5. After the production of the rods 2 and the placement of the rods 2 or the reinforcing structures 1 on the surface of the basic structure 4, no relative movement or movement of the produced rods 2 relative to other already produced or yet to be produced rods 2 or to the basic structure 2 is necessary, because the rods 2 are already produced with the process unit 5 at the required connecting position on the basic structure 4. FIG. 2 does not show the rollers 22 and the hybrid yarns 21. The reinforcing structure 1 consists of rods 2 of the composite material 29, namely with fibres 45 as glass fibres 45 and the matrix 44 as the thermoplastic material.

In a further, not depicted embodiment of the process unit 5, the fibres, for example glass, aramid, or carbon fibres, are wound onto the rollers 22 and the matrix as the thermoplastic material is stored separately in a heated state in a container with a container heater and conveyed to the pultrusion unit 6 by means of a not depicted matrix conveying device. The pultrusion unit 6 and the extrusion unit 7 can also be configured as only one component, for example by carrying out the extrusion, i.e., the final shaping of an outer side 33 of the rod 2 as the extrudate 40, immediately after pultrusion, without the conveying device 12 being disposed between the extrusion unit 7 and the pultrusion unit 6.

In a further, not depicted embodiment, a thermosetting material or a plastic as a reactive hot melt or reactive hot melt adhesive or reactive hot melt polymer is used instead of a thermoplastic material as the matrix. The thermosetting material is stored separately in a container and fed to the extrusion unit 7 and/or the pultrusion unit 6 using a matrix conveying device. The hardening of the thermosetting material is carried out by means of irradiation or the addition of chemical additives. The hardening of the plastic as a reactive hot melt or reactive hot melt adhesive or reactive hot melt polymer is in particular carried out via heating as a change parameter during the processing of the matrix in the pultrusion unit 6 and/or in the extrusion unit 7. Deviating from this, the hardening of the plastic as a reactive hot melt can also be carried out with the aid of moisture and/or UV light and/or the removal of oxygen. In the case of hardening by UV light, the at least one reinforcing structure 1 is irradiated with UV light by means of a UV light source (not depicted) after the at least one reinforcing structure 1 has been placed on the basic structure 4.

In a further, not depicted embodiment of the process unit 5, the composite tapes are wrapped onto the rollers 22. Due to a preconsolidation of the matrix 44, the fibres 45 of composite tapes are already at least partially, and in particular completely, materially bonded to the matrix 44, so that generally only a slight material bond between the fibres 45 and the matrix 44 is created in the pultrusion unit 6.

Figure 3:
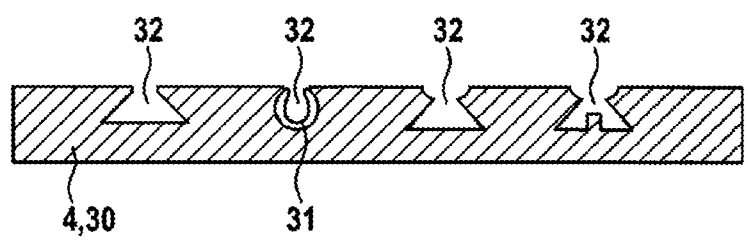
Figure 4:
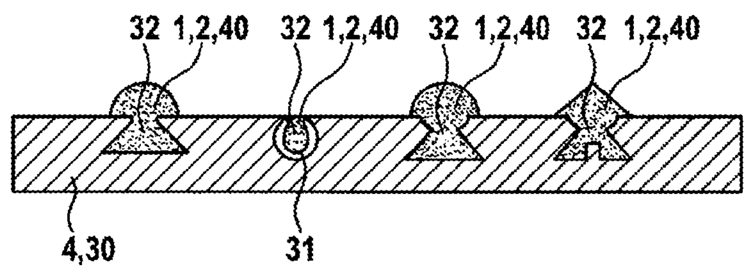
Figure 5:
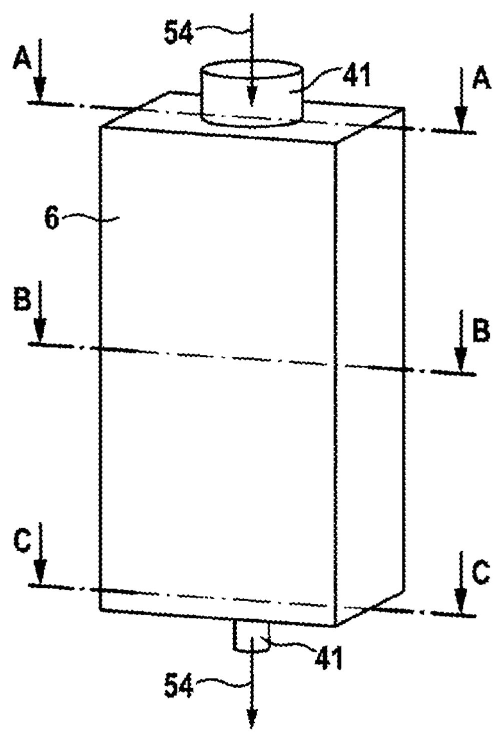
Figure 6:
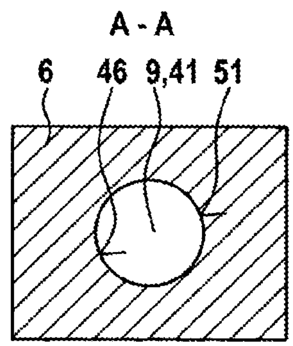
Figure 7:
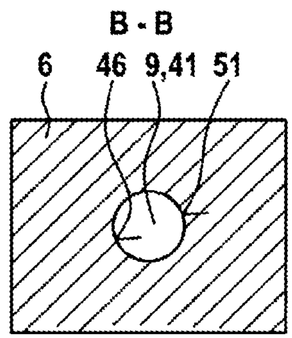
Figure 8:
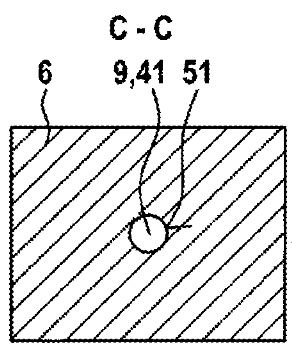
Figures 9, 10:
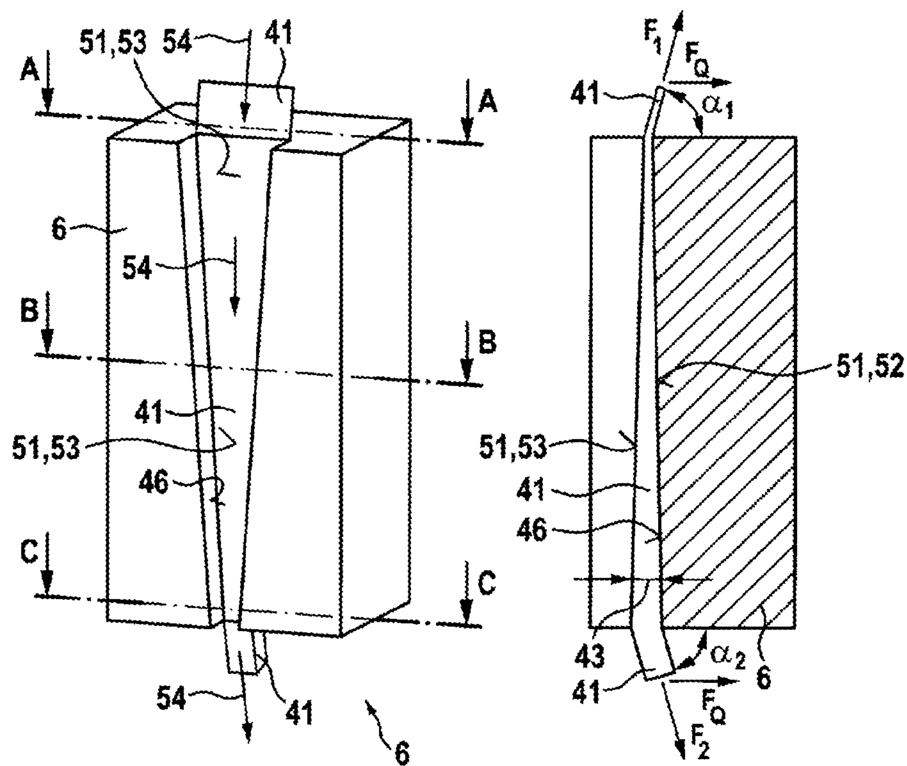

Preprocessing devices 34, 36, 38 as a tool 34, as a milling tool 35, a basic structure heating device 36, for example a laser 37 or an infrared radiator 38, and a supply device 39 for adhesive 31 are attached to the process unit 5 (shown only in FIG. 2). The tool 34, the basic structure heating device 36 and the supply device 39 can be moved relative to the process unit 5 with mechanical devices, so that the preprocessing devices 34, 36, 38 can be disposed in the required position on different movement paths 26 with different surfaces of basic structures 4. Prior to placing the reinforcing structure 1 produced on the process unit 5 on the surface of the basic structure 4, an elongated recess 32 (FIG. 3) having any desired cross-sectional shape, depending on the geometry of the milling tool 35, is milled into the basic structure 4 with the milling tool 35. The recesses 32 have an undercut, so that, after cooling and hardening of the composite material 29 with the fibres and the matrix within the recess 32, a form-locking connection of the rods 2 as the reinforcing structure 1 on the basic structure 1, for example plates 30, is formed.

The surface of the basic structure 4 is then heated in the region of the recess 32 with the basic structure heating device 36, so that the matrix of the composite material 29 can bond with the material of the basic structure 4 and, after cooling and hardening of the composite material 29 and the basic structure 4, there is a solid material bond between the basic structure 4 and the reinforcing structure 1.

Subsequently, adhesive 31 is applied to the surface of the basic structure 4 in the region of the recess 32 with the supply device 39 in order to materially bond the reinforcing structure 1 to the basic structure 4 after the reinforcing structure 1 has been placed on the basic structure 4 and the adhesive 31 has hardened. In general, depending on the material of the basic structure 4, only the basic structure heating device 36 or only the supply device 39 is operated. For a basic structure 4 made of metal, for example steel or aluminium, only the supply device 39 and not the basic structure heating device 36 is operated. For a basic structure 4 made of thermoplastic material, only the basic structure heating device 36 and not the supply device 39 is operated.

FIGS. 5 to 8 show a pultrusion unit 5 known from the state of the art of a (not depicted) process unit 5 known from the state of the art, whereby necessary functional components, such as a first heating device or a first cooling device, are not shown for the sake of simplicity. The crude extrudate 41 is moved through a pultrusion channel 9. The pultrusion channel 9, which is circular in cross-sectional shape and tapers conically in the movement direction 54 of the crude extrudate 41, is bounded by a shaping wall 46 of the pultrusion unit 6. In the section in FIGS. 6 to 8 perpendicular to the movement direction 54 of the crude extrudate 41, the entire outer side 51 of the crude extrudate 41 rests on the shaping wall 46, so that there is a closed pultrusion channel 9. In the case of a small cross-sectional shape of the pultrusion channel 9, in particular in the end region, for diameters less than 1 mm, the material tolerances of the fibres 45 and the matrix 44 can lead to clogging and blockages, so that the pultrusion unit 6 is no longer functional, i.e., the process unit 5 can no longer produce extrudate 40. The cross-sectional area available to the crude extrudate 41 is limited by the closed pultrusion channel 9 and local increases in the cross-sectional area of the crude extrudate 41 to prevent blockages are structurally impossible. Due to the closed form of the pultrusion channel 9, the pressure of the crude extrudate 41 is high and increases sharply due to the decreasing cross-sectional area as the crude extrudate 41 moves through the pultrusion channel 9.

FIGS. 9 to 13 show a first embodiment of the pultrusion unit 6 of the process unit 5 according to the invention. For the sake of simplicity, necessary functional components, such as a first heating device or a first cooling device, are not shown. A (not depicted) heating device is configured on the shaping walls 46, which allows the crude extrudate 41 to be heated by the heated shaping walls 46 so that the matrix 44 can be deformed and the fibres 45 can optionally bond materially with the matrix 44 during pultrusion in the pultrusion unit 6. The process steps of deforming the crude extrudate 41 and preferably materially bonding the fibres 45 with the matrix 44 are thus carried out in the pultrusion unit 6. The substantially U-shaped pultrusion channel 9 is partially open, so that, on the outer side 51, the crude extrudate 41 rests on a first portion 52 of the outer side 51 with fixed shaping walls 46 and, on a second portion 53 of the outer side 51, the outer side 51 has no contact with the shaping wall 46, i.e., there is contact only with the ambient air. Because of the open second portion 52 of the outer side 51, the pressure of the crude extrudate 41 is very small and substantially constant as the crude extrudate 41 moves through the pultrusion channel 6.

Figure 11:
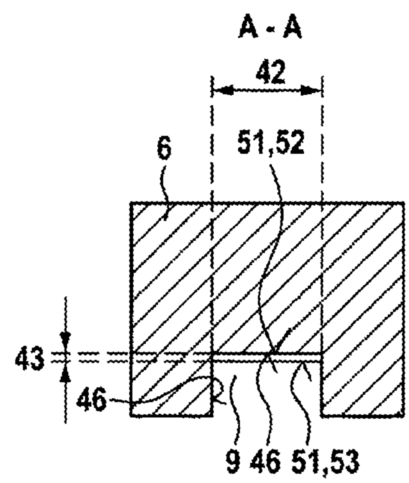
Figure 12:
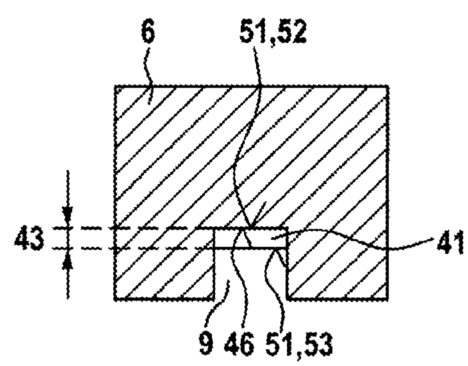
Figure 13:
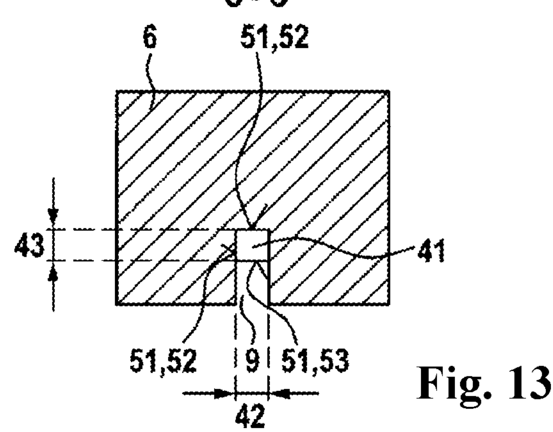

In the section in FIGS. 11 to 13 perpendicular to the movement direction 54 of the crude extrudate 41, the three shaping walls 46, which are fixed, in particular in a movement direction 54 of the crude extrudate 41, are perpendicular to one another and two shaping walls 46 are aligned parallel to one another in the section. The crude extrudate 41 in the pultrusion channel 9 has a width 42 and a thickness 43. The shaping walls 46, which are aligned parallel to one another in the section, also taper conically toward one another in the movement direction 54 of the crude extrudate 41 (FIG. 9), so that the width 42 decreases and the thickness 43 increases as the crude extrudate 41 moves through the pultrusion channel 9 (FIGS. 11 to 13). Even with a distance smaller than the width 42, for example 0.5 mm, in the end region of the pultrusion channel 9 between the two shaping walls 46 aligned parallel to one another in the section, material tolerances in the fibres 45 and the matrix 44 do not lead to a blockage of the crude extrudate 9 because, in view of material tolerances, the deformable crude extrudate 41 can move into the region of the pultrusion channel 9 without crude extrudate 41; i.e., the thickness 43 increases locally and the blockage is consequently avoided. The maximum cross-sectional area of the crude extrudate 41 can thus be increased substantially, because the free space in the pultrusion channel 9 is dimensioned such that the increases in the cross-sectional area of the crude extrudate 41 that are required in the event of material tolerances are available to prevent blockages. The thickness 43 of the crude extrudate 41 is the extension of the crude extrudate 41 in the direction of the opening of the pultrusion channel 9 and/or in the direction perpendicular to the width 42 of the crude extrudate 41. The width 42 of the crude extrudate 41 is the extension of the crude extrudate 41 in the direction perpendicular to the thickness and/or the extension of the crude extrudate 41 between the two shaping walls 46.

Because the three shaping walls 4 are fixed, the relative movement speed between the crude extrudate 41 and the three shaping walls 46 corresponds to the movement speed of the crude extrudate 41. Not depicted tensioning devices, in particular tensioning rollers, which exert a tensile force F1 and F2 on the crude extrudate 41, are provided at the beginning and end of the pultrusion unit 6, so that the crude extrudate 41 in the pultrusion unit 6 has a tensile force. The tensile force F1 is smaller than the tensile force F2, so that the crude extrudate 41 is moved through the pultrusion channel 9 under a tensile force in the crude extrudate 41, in particular a tensile force in the fibres 45 of the crude extrudate 41. The tensioning devices, in particular tensioning rollers, additionally function as deflecting devices, in particular deflecting rollers, so that the crude extrudate 41 is deflected before being introduced into the pultrusion channel 9 and after being discharged from the pultrusion channel 9 and the crude extrudate 41 is oriented at an angle $\alpha 1$ before being introduced and at an angle $\alpha 2$ after being discharged. The angles $\alpha 1$ and $\alpha 2$ are less than 90°, so that the crude extrudate 41 is not aligned parallel to the movement direction 54 in the pultrusion channel 9 when being introduced and discharged, but rather at an acute angle. For this purpose, the deflecting devices exert a lateral force FQ on the crude extrudate 41 when it is being introduced and discharged. The lateral force FQ is a function of the angles $\alpha 1$ and $\alpha 2$.

Figure 14:
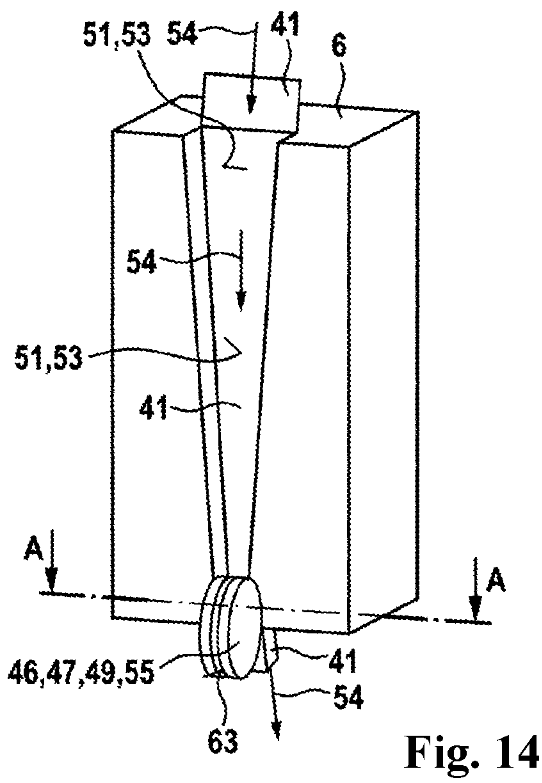
Figure 15:
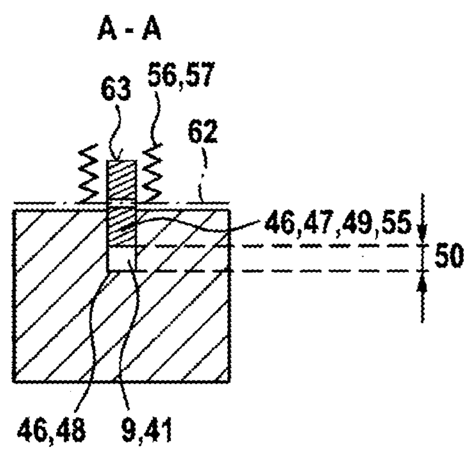
Figure 24:
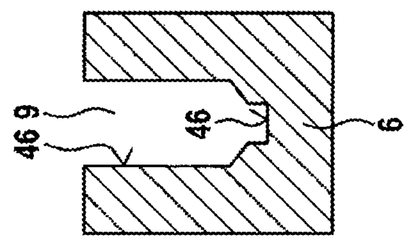
Figure 23:
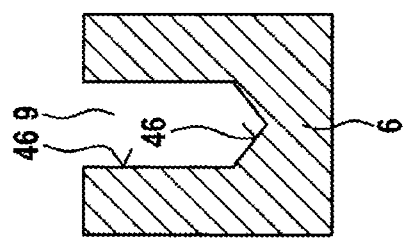

FIGS. 14 and 15 show a second embodiment of the pultrusion unit 6 of the process unit 5 according to the invention. In the following, only the differences to the first embodiment in FIGS. 9 to 13 are described. A roller 55 is disposed at an end region of the partially open pultrusion channel 9. The roller 55 is mounted so as to be rotatable about an axis of rotation 62 and a radial outer side 63 as a surface of the roller 55 rests on the second portion 53 of the outer side 51 of the crude extrudate 41 and deforms the second portion 53. Therefore, at this end region of the pultrusion channel 9 with the roller 55, there is a closed pultrusion channel 9. The axis (not depicted) of the roller 55 is pressed by an elastic element 56 as a spring 57 against the second portion 53 of the outer side 51 with a pressing force, so that the radial outer side 63 rests with a pressing force on the second portion 53 of the outer side 51 of the crude extrudate 41. The axis of the roller 55 is furthermore mounted in a direction perpendicular to the movement direction 54, so that the radial outer side 63 of the roller 55 as the first shaping wall 47, which rests on the crude extrudate 41, changes the distance 50 to the opposite shaping wall 46 as the second shaping wall 48. The cross-sectional area is thereby changed as well. The roller 55 thus also forms a movement wall 49 as a moving shaping wall 46. The axial extension of the roller 55 is slightly smaller than the width 42 of the crude extrudate 41 or the distance between the shaping walls 46 aligned parallel in the section, so that the roller 55 is partially disposed in the pultrusion channel 9. Changes in the cross-sectional area of the crude extrudate 9, in particular as a result of material tolerances, can thus be absorbed by the movement as a translational movement of the roller 55 without the risk of blockages of the crude extrudate 9. Due to the rotational movement of the roller 55 about the axis of rotation, the first shaping wall 47 formed by the radial outer side 63 of the roller 55 follows the translational movement of the crude extrudate 41, so that there is substantially no relative movement speed between the rotating radial outer side 63 of the roller 55 and the second portion 53 of the outer side 51 of the crude extrudate 41.

FIGS. 16 and 19 show a third embodiment of the pultrusion unit 6 of the process unit 5 according to the invention. In the following, only the differences to the first embodiment in FIGS. 9 to 13 are described. The pultrusion channel 9 is formed by the radial outer sides 63 of three rollers 55. The radial outer sides 63 thus have a concave, substantially U-shaped surface 59. The width 42 of the pultrusion channel 9 and thus of the crude extrudate 41 decreases from the first roller 55 shown in FIG. 17 to the third roller 55 shown in FIG. 19, and the roller 55 shown in FIG. 18 has an intermediate width 42 between the first and third roller 55. Due to the rotational movement of the rollers 55, there is substantially no relative movement speed between the radial outer side 63 of the rollers 55 and the crude extrudate 41. The crude extrudate 41 heated with a not depicted heating device is deformed at the three sections of the pultrusion channel 9 of the three rollers 55. The rollers 55 are also provided with a further optional heating device, in particular an electrical resistance heating device, so that the matrix 44 can be heated for the optional material bond with the fibres 45.

FIG. 20 shows a fourth embodiment of the pultrusion unit 6 of the process unit 5 according to the invention. In the following, only the differences to the third embodiment in FIGS. 16 to 19 are described. The three sections of the pultrusion channel 9 are bounded by two rollers 55. The radial outer sides 63 of the two rollers 55 in a respective section are identical and correspond to those in the third embodiment shown in FIGS. 16 to 19. The concave, substantially U-shaped radial outer sides 63 usually respectively bound half of the pultrusion channel 9 in a respective section. The radial outer sides 63 of the two rollers 55 in a respective section usually lie on top of one another outside the substantially U-shaped recesses. The axis of a roller 55 in a respective section cannot be moved in the space perpendicular to the movement direction 54 of the crude extrudate 41, so that this roller 55 forms a second shaping wall 48. The other roller 55 as the first shaping wall 47 in a respective section is pressed with an elastic element 56 as a spring 57 against the roller 55 that forms the second shaping wall 48. The axis of the other roller 55 as the first shaping wall 47 is mounted to be movable in a movement direction perpendicular to the movement direction 54 of the crude extrudate 41, so that the roller 55 as the first shaping wall 47 also forms a movement wall 49 because the distance between the two rollers 55 in a respective section can be changed. When the distance between the two rollers 55 of a section is increased, the cross-sectional area of the crude extrudate 41 is increased to avoid blockages of the crude extrudate 41 in view of material tolerances.

Figure 22:
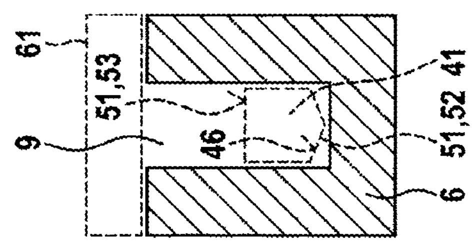
Figure 21:
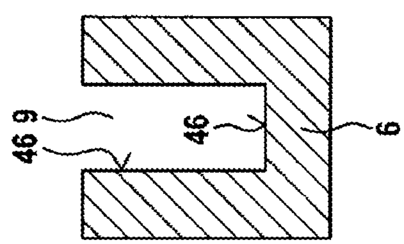

FIGS. 21 to 24 show different cross-sectional shapes for fixed shaping walls 46 for the substantially U- or V-shaped pultrusion channel 9. FIG. 22 shows a covering wall 61 and the crude extrudate 41 with dashed lines. The crude extrudate 41 is at a large distance from the covering wall 61, so that even in the event of large material tolerances and a large increase in the cross-sectional area of the crude extrudate 41, the crude extrudate 41 has no contact with the covering wall 61 and there is also a partially open pultrusion channel 9 in FIG. 22. The covering wall 61 allows the crude extrudate 41 and/or the fibres 45 with the matrix 44 to be placed more easily into the pultrusion channel 9 during the initial setup, and the partially open pultrusion channel 9 is protected from contamination and mechanical influences from outside.

Figures 25, 26, 27, 28:
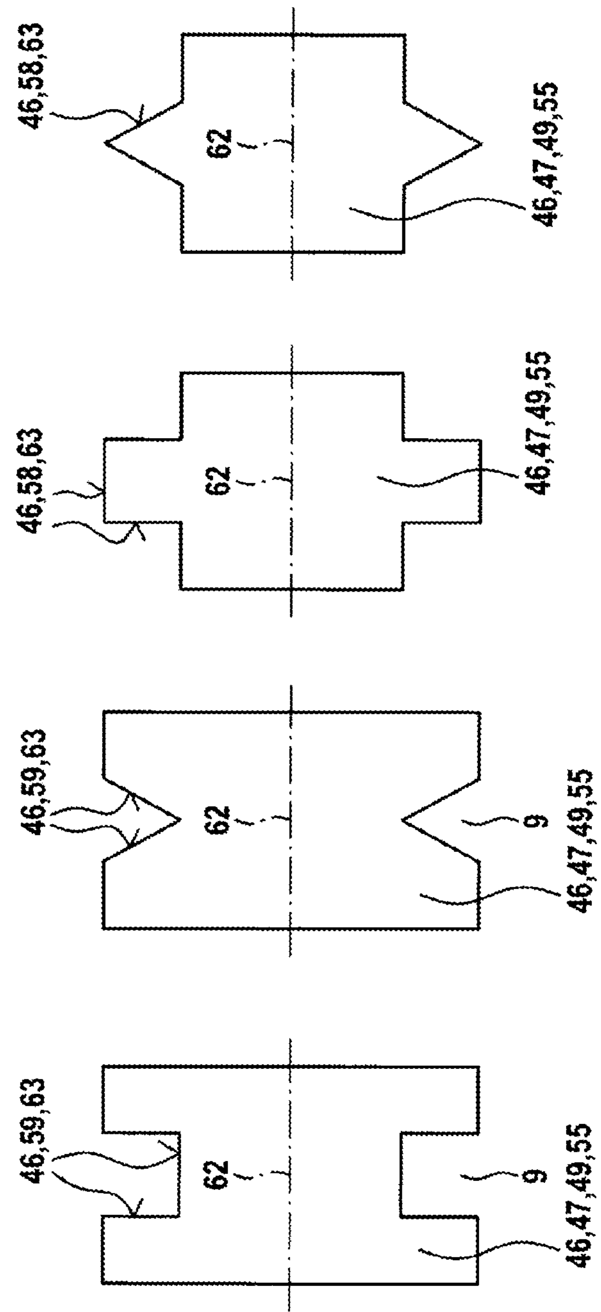

FIG. 25 and FIG. 26 show examples of the concave surface 59 of the radial outer side 63 of the rollers 55. The recess for the pultrusion channel 9 is substantially U-shaped in FIG. 25 and substantially V-shaped in FIG. 26.

FIG. 27 and FIG. 28 show examples of the convex surface 58 of the radial outer side 63 of the rollers 55. In FIG. 27, the convex surface 58 is substantially U-shaped and in FIG. 28 it is substantially V-shaped. The rollers 55 shown in FIGS. 27 and 28 allow a deformation of the second portion 53 of the outer side 51 of the crude extrudate 41, for example in the embodiment shown in FIGS. 14 and 15.

Figure 29:
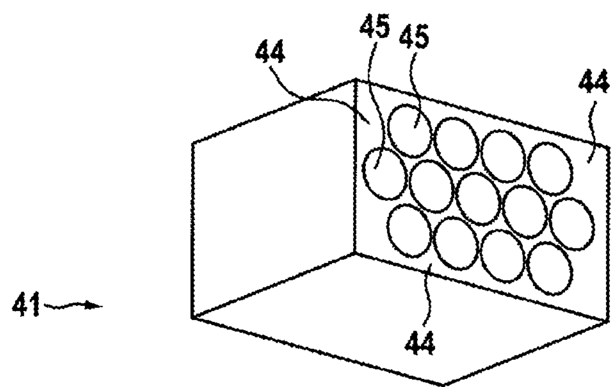
Figure 30:
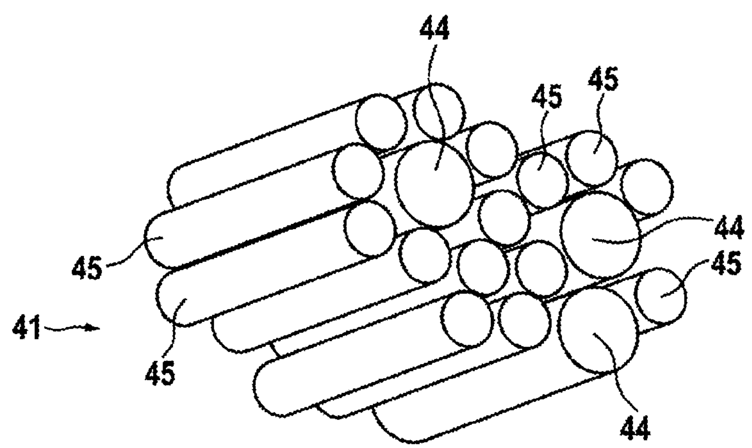
Figure 31:
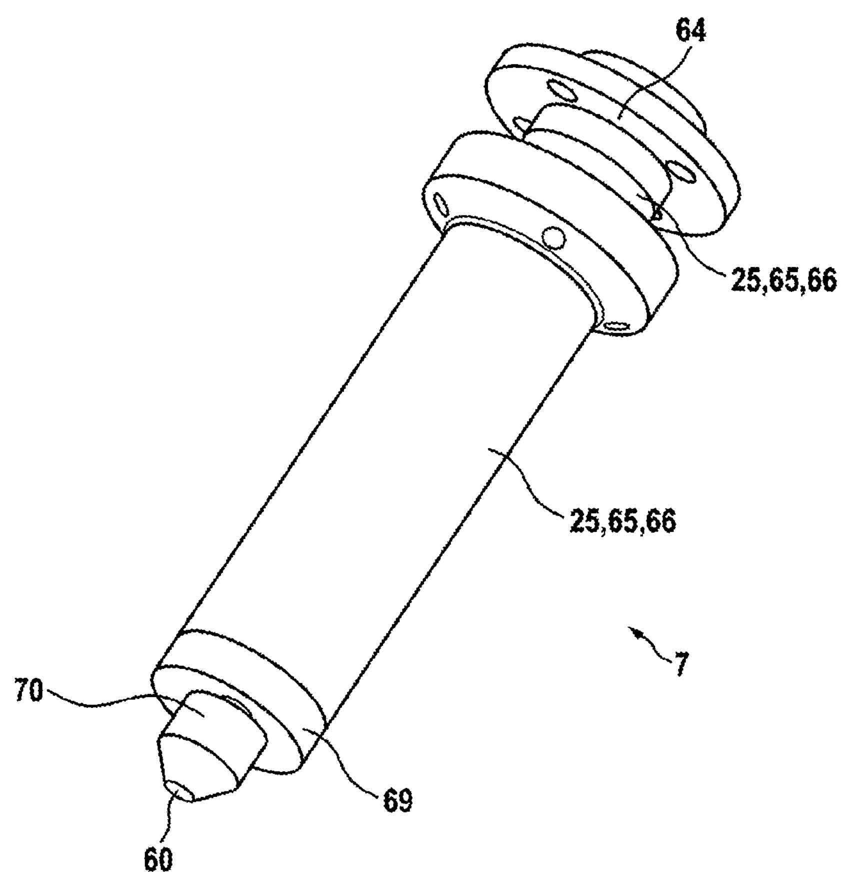
Figure 32:
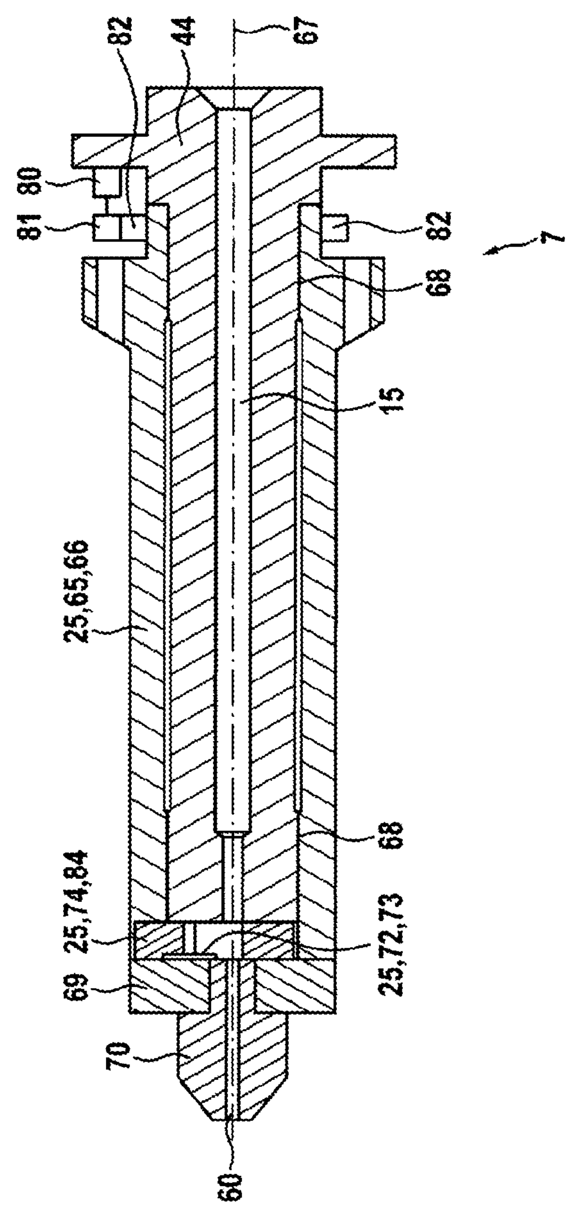

FIGS. 29 and 30 show two examples for the configuration of the matrix 44 and the fibres 45 as the crude extrudate 41 before being introduced into the pultrusion channel 9. The matrix 44 and the fibres 45 are flexible and rolled up on a roller 22. FIG. 29 shows a strip with a substantially rectangular cross-section, in which the fibres 45 are surrounded by the matrix 44. In FIG. 30, the matrix 44 is divided into several strand-like pieces, between and around which the fibres 45 are disposed.

The embodiments shown in FIGS. 1 to 30 serve as a basic explanation of the functional principle and description of further features according to the invention, in particular a partially open pultrusion channel 9, a process unit 5 with a pultrusion unit 6 and an extrusion unit 7, as well as additional features such as the necessary heating devices 8, 16.

The essential inventive features of the process unit 5 with the extrusion unit 7 and an optional pultrusion unit 6 are shown in FIGS. 31 to 34 which are discussed in the following. Necessary devices, such as a heating device 16, and also the pultrusion unit 6 are not shown in FIGS. 31 to 34, so that in this respect reference is made to the disclosure in FIGS. 1 to 30.

The extrusion unit 7 comprises an extrusion channel 15 that is heated by not depicted heating devices. The extrusion channel 15 is directly bounded by a base body 64 and a die section 70. The extrusion channel 15 ends at the die section 70 as the opening 60 for the discharge of the extrudate 40.

On a radial outer side of the base body 64, a component 65 is attached to the base body 64 as a sleeve 66 and is mounted on the base body 64 with a slide bearing 68, so that the component 65 can be caused to carry out a rotational movement 71 about an axis of rotation 67. The slide bearing 68 thus makes the rotational movement 71 of the component 65 possible. The component 65 encloses a significant portion of the extrusion channel 15 and the axis of rotation 67 of the component 65 is substantially identical to the longitudinal axis of the extrusion channel 15. A toothed ring 82 with teeth is attached to the outside of an axial end region of the component 65, and the teeth of the toothed ring 82 mesh with teeth of a toothed wheel 81. The toothed wheel 81 is connected to a drive shaft of an electric motor 80 (shown only in FIG. 32), so that the component 65 can be caused to carry out the rotational movement 71 with the electric motor 80.

A circular recess 83 is configured on the die section 70 on an axial end region of the component 65 and is aligned eccentrically to the axis of rotation 67. The circular recess 83 comprises an end 85. A cutting element 72 as a knife 73 is disposed in the circular recess 83. The cutting element 72 and a slide 74 are mounted on the base body 64 with a slide bearing 79, so that the slide 74 and the cutting element 72 can carry out a translational movement between the first position shown in FIG. 33 and a second position shown in FIG. 34. A first end 75 of the slide 74 rests on a first contact region 77 on the component 65; i.e., a region or a supporting surface of the component 65 that bounds the circular recess 83. In a similar manner, a second end 76 of the slide 74 rests on a second contact region 78 on the component 65. The slide 74, the circular recess 83 and the slide bearing 79 thus form a mechanical coupling device 84 for the mechanical coupling of the cutting element 72 to the rotating component 65 as a sleeve 66.

Figure 33:
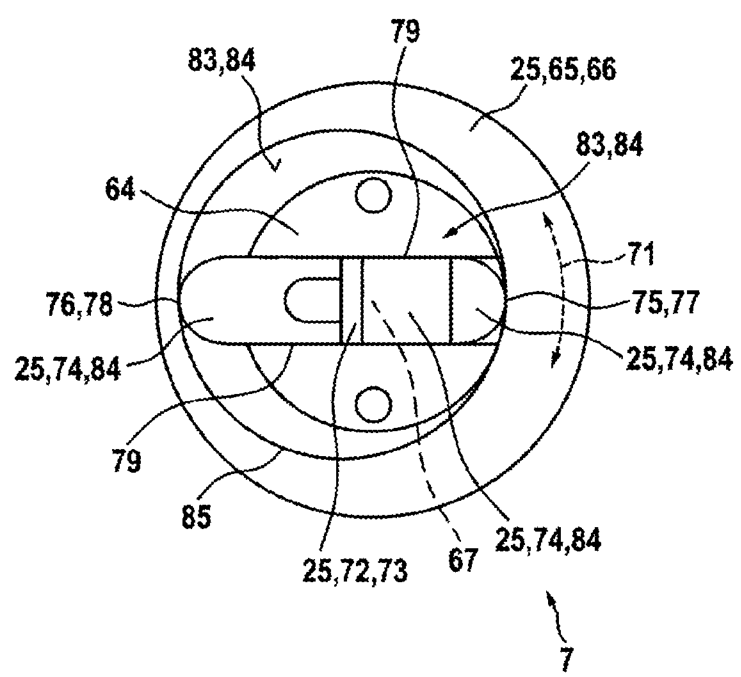
Figure 34:
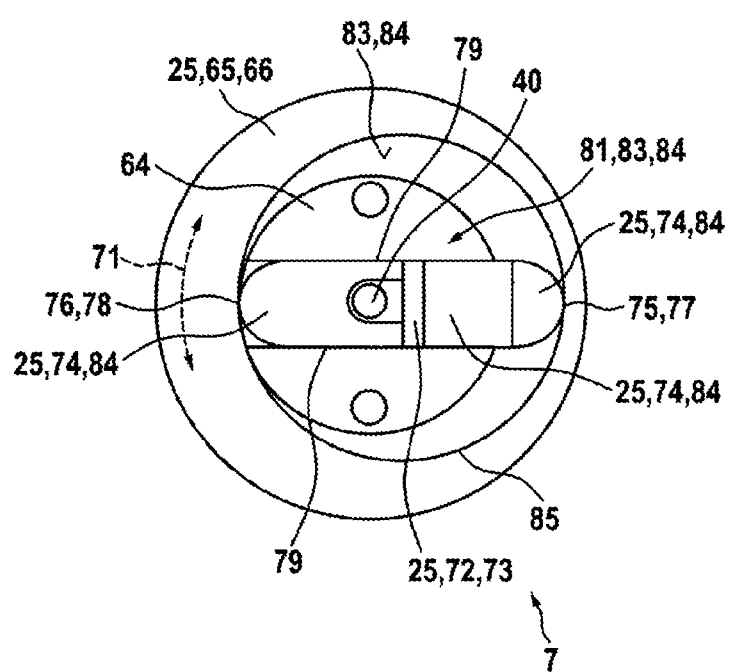

When the cutting element 72 as a knife 73 is moved from the second position shown in FIG. 34 to the first position shown in FIG. 33, the extrudate 40 being discharged from the opening 60 is separated or cut off. This requires a 180° rotational movement 71 of the component 65. A further rotational movement 71 of the component 65 by an additional 180° causes a translational movement of the slide 74 with the knife 73 from the first position shown in FIG. 33 to the second position shown in FIG. 34. In the second position shown in FIG. 34, extrudate 40 is extruded from the extrusion channel 15. To separate, i.e., cut, the extrudate 40, the component 65 is caused to carry out a 360° rotational movement 71 by the electric motor 80 as a servomotor 80, so that the extrudate 40 is cut and the slide 74 with the knife 73 is then moved back to the second position shown in FIG. 34 and remains in this position for further extrusion with a stationary component 65. For this purpose, the electric motor 80 is accordingly controlled by a not depicted control and/or regulating unit of the process unit 5 with the extrusion unit 7. The two ends 75, 76 of the slide 74 constantly rest on the contact regions 77, 78 on the component 65, because the distance between the two ends 75, 76 of the slide 74 corresponds to the diameter of the circular recess 83. The cutting element 72 thus rests indirectly on the component 65 by means of the slide 74.

Deviating from this, the distance between the two ends 75, 76 of the slide 74 can be smaller than the diameter of the circular recess 83, so that the slide 74 rests on the component 65 only at one end 75 as only one contact region 77 and a force in the direction toward the contact region 77 is applied to the second end 76 by an elastic element, in particular a spring (not depicted).

The extrusion unit 7 shown in FIGS. 31 to 34 can be disposed on process units 5 without a pultrusion unit 6 and on process units 5 with a pultrusion unit 6, in particular a pultrusion unit 6 shown in FIGS. 1 to 30.

All in all, significant advantages are associated with the method for producing an extrudate 40 according to the invention and the process unit 5 according to the invention. The mechanical coupling device 84 enables the cutting element 72 to be moved reliably and safely between the first and second position for separating or cutting the extrudate 40 and for extrusion without the need for an elaborate mechanism with an electric motor 80 that requires a large amount of installation space in the region of the opening 60.

The invention claimed is:

1. A method for producing an extrudate, the method comprising:

introducing a crude extrudate comprising matrix and fibres into a pultrusion unit;

deforming the crude extrudate in the pultrusion unit wherein, during movement of the crude extrudate through a pultrusion channel of the pultrusion unit, an outer side of the crude extrudate rests on at least one shaping wall of the pultrusion unit;

discharging the deformed crude extrudate from the pultrusion unit;

introducing the crude extrudate discharged from the pultrusion unit into an extrusion unit;

deforming the crude extrudate in the extrusion unit and discharging the crude extrudate that has been reshaped to form the extrudate from an opening of the extrusion unit; and cutting the extrudate by moving a slide including a cutting element;

wherein the extrusion unit includes a component configured as a sleeve that is attached to a base body and carries out a rotational movement, and the cutting element is moved by a mechanical coupling between the rotating component and the cutting element to cut the extrudate; and wherein the slide rests on a first contact region of a circular recess of the component, the circular recess being aligned eccentrically to the axis of rotation of the component.

2. The method of claim 1, wherein the rotational movement of the component is converted into a movement having a movement direction substantially perpendicular to an axis of rotation of the rotational movement of the component by the mechanical coupling.

3. The method of claim 1, wherein the cutting element carries out a rotational movement or a translational movement.

4. The method of claim 1, wherein the extrusion unit includes an extrusion channel and the rotating component encloses the extrusion channel.

5. The method of claim 1, wherein a force is applied with the slide from the rotating component to the cutting element to move the cutting element.

6. A process unit, comprising:

a pultrusion unit with a pultrusion channel and the pultrusion channel is bounded by at least one shaping wall;

an extrusion unit with an extrusion channel and an opening for discharging an extrudate from the extrusion channel;

a cutting unit with a movable cutting element for cutting the extrudate with the movable cutting element; and a conveying device for conveying a crude extrudate comprising matrix and fibres from the pultrusion unit into the extrusion unit;

wherein the cutting unit includes a component configured as a cylinder jacket that encloses the extrusion channel and that can be caused to carry out a rotational movement and the component is mechanically coupled to the cutting element by a mechanical coupling device, so that the rotational movement of the component causes the movement of the cutting element.

7. The process unit of claim 6, wherein a distance between an axis of rotation of the component that can be caused to carry out the rotational movement and the extrusion channel is smaller in diameter as compared to a diameter of the extrusion unit.

8. The process unit of claim 7, wherein a circular recess on the component is configured as a mechanical coupling device and at least one end of the cutting element rests on a supporting surface of the circular recess of the component so that a rotational movement of the component causes a movement of the cutting element.

9. The process unit of claim 8, wherein a first and a second end of the at least one end of the cutting element rests constantly indirectly or directly on the circular recess, a distance between the first and the second end substantially corresponding to the diameter of the circular recess.

10. The process unit of claim 6, wherein the extrusion unit includes a motor selected from the group consisting of an electric motor, a pneumatic motor, and a hydraulic motor, and the component is driven by said motor.

* * * * *